Patented May 18, 1954

2,678,944

UNITED STATES PATENT OFFICE 2,678,944

STABILIZATION OF UNSATURATED NITRILES

Peter D. Burland, Texas City, Tex., assignor to Monsanto Chemical Company, St. Louis, Mo., a corporation of Delaware No Drawing. Application August 23, 1952,
Serial No. 306,060

12 Claims. (Cl. 260—465.9)

This invention relates to the stabilization of unsaturated nitriles. More specifically, this invention relates to the inhibition of the polymerization of alpha, beta-unsaturated nitriles.

The unsaturated nitriles, particularly the alpha, beta-unsaturated nitriles, are extremely useful chemical compounds. Considerable quantities of these materials are used for the preparation of synthetic rubbers and various types of synthetic resins. These materials, however, possess a characteristic which all too frequently hampers not only their utility, but also the purification techniques commonly employed in their preparation. All of these materials exhibit a tendency to polymerize when subjected to periods of storage and/or to elevated temperatures. Such polymerization results in a darkening of the unsaturated nitrile monomer and ultimately in the formation of solid polymer contaminant.

Since most applications or uses of the unsaturated nitriles require high-purity products, these polymerization characteristics present a serious problem in the preparation and storage of finished grade material. Furthermore, since distillation at elevated temperatures is the commonly used purification technique, purification is hampered by solid polymer formation which accumulates in the equipment, ultimately plugging the column. To add to this latter problem, impurities present in crude unsaturated nitriles are frequently of the type which accelerate polymerization. For example, acrylonitrile containing small quantities of acetaldehyde exhibits a greater tendency to polymerize than does relatively pure acrylonitrile.

Attempts to eliminate this problem have been made in the past by the addition of inhibitors which retard or prevent the polymerization of unsaturated nitriles. Unfortunately, the inhibitors heretofore used, while exhibiting some inhibitory effects, have not proven to be completely satisfactory. To be of practical utility, the inhibitor must not impart any undesirable color to the unsaturated nitrile, be sufficiently inhibitory to manifest its effect over extended periods of storage, inhibit polymer formation at elevated temperatures to permit utility in distillation purification techniques, and be readily separable from the unsaturated nitrile or inert in subsequent reactions of the inhibited product. The inhibitors heretofore used have not satisfied all of these requirements.

It is an object of this invention to provide an improved method for preventing or inhibiting the polymerization of unsaturated nitriles by the addition of an inhibitor which does not possess the deficiencies exhibited by these inhibitors heretofore used. A still further object of this invention is to provide novel stabilized compositions comprising an unsaturated nitrile and an added polymerization inhibitor, which can then be subjected to extended periods of storage, or purification distillations at elevated temperatures without exhibiting any significant evidence of polymer formation. Further objects of this invention will become apparent from the description which follows.

It has been discovered that the polymerization of unsaturated nitriles, particularly the alpha, beta-unsaturated nitriles, can be prevented or inhibited by mixing therewith a minor amount of a phenanthroline. It has been found that a composition comprising an unsaturated nitrile and a minor amount of a phenanthroline will not exhibit any significant polymer formation on prolonged periods of storage, or when subjected to the temperatures commonly encountered during purification distillation techniques.

The following examples illustrate, but do not limit, this invention.

Example I

A 500 ml. round bottom flask equipped with a thermometer, stirrer and a sample entry tube is immersed in a constant temperature water bath maintained at 35° C. 150 ml. of water is placed in the flask and nitrogen bubbled through at a slow continuous rate. 0.1560 g. of $NaHSO_3$ is then added and the mixture allowed to attain thermal equilibrium. Following this, 10 g. of acrylonitrile is added followed by 0.405 g. of $K_2S_2O_8$. The mixture of sodium bisulfite and potassium persulfate serves as a polymerization accelerator. Polymerization is allowed to continue for one hour following the end of an induction period indicated by a slight turbidity developing in the mixture. After one hour, the polymer formed is removed by filtration, washed with water and acetone and dried at 77–83° C. Approximately 8 g. of polymer is obtained, indicating a polymer yield of approximately 80% based upon acrylonitrile charged.

Example II

The procedure set forth in Example I is repeated with the exception that 0.0005 g. of 1,10-phenanthroline is added to the 150 ml. of water initially placed in the reaction vessel. In this case, less than 1.0% of polymer is formed in the same time interval that resulted in 80% polymer formation in Example I.

1,10-phenanthroline may be represented by the following structural formula:

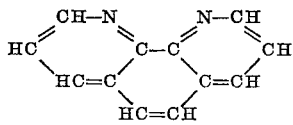

*Example III*

The procedure set forth in Example I is repeated with the exception that 0.0005 g. of 1,5-phenanthroline is added to the 150 ml. of water initially placed in the reaction vessel. No significant polymer formation is evident.

*Example IV*

The procedure set forth in Example I is repeated with the exception that 0.0005 g. of 1,8-phenanthroline is added to the 150 ml. of water initially placed in the reaction vessel. No significant polymer formation is evident.

*Example V*

Samples of acrylonitrile, methacrylonitrile, crotonitrile, α-ethyl acrylonitrile, β-hexyl acrylonitrile, α,β - dimethyl acrylonitrile, α - furfuryl acrylonitrile, α-butyl acrylonitrile, β-(2-chloroethyl) acrylonitrile, β - ethyl acrylonitrile, α-naphthyl acrylonitrile, α-(2-chlorobutyl) acrylonitrile and α-(4-hydroxyphenyl) acrylonitrile are stabilized by mixing therewith 50 parts by weight of 1,10-phenanthroline per million parts of the nitrile. After extended periods of storage of these samples at atmospheric temperatures, no significant discoloration or polymer formation is evident.

While the preceding examples have illustrated specific embodiments of this invention, obviously substantial variation is possible without departing from the scope thereof. For example, the quantity of the phenanthroline used to inhibit the polymerization of the unsaturated nitrile can be varied widely, depending upon the particular nitrile to be stabilized and the degree of inhibition desired. In general, minor amounts of phenanthroline are used. An advantage of phenanthroline in such an application as this is the fact that it can be used in extremely small quantities due to its strong inhibitory qualities. Concentrations in the range of from about 0.5 to about 1000 parts by weight of phenanthroline per million parts of the nitrile are highly preferred. These low concentrations afford adequate stability for most applications and greatly simplify subsequent processing of the inhibited nitrile. Of course, higher concentrations of the inhibitor in the nitrile can be used if desired, resulting in a nitrile monomer even more strongly inhibited against polymerization.

Phenanthroline can be used to stabilize unsaturated nitriles under any types of conditions. Thus, it can be used to inhibit polymer formation in unsaturated nitriles during storage under atmospheric conditions of light, air, temperature and pressure and during purification of the crude nitrile monomer. To inhibit polymer formation during distillation of the unsaturated nitrile, the inhibitor can be added to the feed stream to the column or introduced separately at some point in the distillation column. Preferably, the inhibitor is introduced at the top of the column to provide maximum inhibition throughout the entire system.

The alpha, beta-unsaturated nitriles, represented by the formula

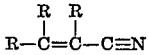

wherein the R's are the same or different and selected from the group consisting of hydrogen and alkyl radicals containing from 1 to 8 carbon atoms, respond readily to the stabilizing effect of the inhibitors disclosed herein. Acrylonitrile, alpha-substituted acrylonitrile wherein the substituent on the alpha carbon atom is an alkyl radical containing from 1 to 8 carbon atoms, and beta-substituted acrylonitriles where the substituent on the beta carbon atom is an alkyl radical containing from 1 to 8 carbon atoms, represent a class of monomers which polymerize very readily, but can be most effectively inhibited against polymerization by means of phenanthroline.

Any of the various isomeric phenanthrolines can be used in this invention. For example, 1,10-phenanthroline, 1,5-phenanthroline, 4,7-phenanthroline, and 1,8-phenanthroline are effective as polymerization inhibitors. In addition, the unsaturated nitriles can be stabilized with substituted phenanthrolines as, for example, 5-nitro-1,10 - phenanthroline, 5-bromo-1,10-phenanthroline, 5 - chloro - 1,10 - phenanthroline, 5-methyl-1,10-phenanthroline, etc.

When desired, separation of phenanthroline from the stabilized unsaturated nitrile monomer can be accomplished by any of a variety of simple techniques. For example, it can be extracted by means of a suitable solvent. Preferably, however, the unsaturated nitrile is distilled from the inhibited composition.

What is claimed is:

1. A composition comprising an unsaturated nitrile containing a minor amount of a phenanthroline.

2. A composition comprising an alpha, beta-unsaturated nitrile containing a minor amount of a phenanthroline.

3. A composition comprising a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms, containing a minor amount of a phenanthroline.

4. A composition comprising a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitriles where the substituent on the beta carbon atom is an alkyl radical containing from 1 to 8 carbon atoms, containing a phenanthroline in the amount of from about 0.5 to about 1000 parts by weight per million parts by weight of nitrile.

5. A composition comprising acrylonitrile and from about 0.5 to about 1000 parts by weight of a phenanthroline per million parts of acrylonitrile.

6. A composition comprising acrylonitrile and from about 0.5 to about 1000 parts by weight of 1,10-phenanthroline per million parts of acrylonitrile.

7. A process for inhibiting the polymerization of unsaturated nitriles which comprises mixing therewith a minor amount of a phenanthroline.

8. A process for inhibiting the polymerization of alpha, beta-unsaturated nitriles which comprises mixing therewith a minor amount of a phenanthroline.

9. A process for inhibiting the polymerization of a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms which comprises mixing therewith a minor amount of a phenanthroline.

10. A process for inhibiting the polymerization of a nitrile selected from the group consisting of acrylonitrile, and alpha-substituted acrylonitriles wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms which comprises mixing therewith a phenanthroline in the amount of from about 0.5 to about 1000 parts by weight per million parts by weight of nitrile.

11. A process for inhibiting the polymerization of acrylonitrile which comprises mixing therewith a phenanthroline in the amount of from about 0.5 to about 1000 parts by weight per million parts by weight of acrylonitrile.

12. A process for inhibiting the polymerization of acrylonitrile which comprises mixing therewith 1,10-phenanthroline in the amount of from about 0.5 to about 1000 parts by weight per million parts by weight of acrylonitrile.

References Cited in the file of this patent

UNITED STATES PATENTS

| Number | Name | Date |
| --- | --- | --- |
| 2,375,015 | Marple et al. | May 1, 1945 |
| 2,607,795 | Stehman | Aug. 19, 1952 |

OTHER REFERENCES

Karrer, "Organic Chemistry," (2d Eng. Ed.), p. 784 (1946).

Fieser et al., Organic Chemistry (2d Ed.), p. 856 (1950).